C. C. BETTENHAUSEN.
CRANK PIN SLEEVE.
APPLICATION FILED FEB. 20, 1922.

1,418,519.

Patented June 6, 1922.

CHARLES C. BETTENHAUSEN
INVENTOR.
BY Willard Eddy,
ATTORNEY.

UNITED STATES PATENT OFFICE.

CHARLES C. BETTENHAUSEN, OF PRINCETON, NEBRASKA.

CRANK-PIN SLEEVE.

1,418,519. Specification of Letters Patent. Patented June 6, 1922.

Application filed February 20, 1922. Serial No. 538,014.

*To all whom it may concern:*

Be it known that I, CHARLES C. BETTENHAUSEN, a citizen of the United States, residing at Princeton, in the county of Lancaster and State of Nebraska, have invented certain new and useful Improvements in Crank-Pin Sleeves, and have described the same in the following specification, illustrated by the accompanying drawings.

My invention relates to sleeves which are fixedly applicable to a crankshaft, and which are individually adapted to be journaled in a bearing as a peripheral part of the crankpin. It is the main object of the invention to prevent the crankpin to which the sleeve is applied, from being worn by use, and especially to prevent the same from being worn unevenly, or flat on one side, in the associated connecting-rod bearing; to prolong thereby the life, or duration, of the crankpin, and thus of the crankshaft whereof that pin is part; to adapt the sleeve to be used for the repair of a worn crankshaft; and to make such sleeves easily applicable to a crankshaft in position, and easily removable therefrom, from time to time, as often as renewal may be necessary. To accomplish these results I incorporate in my improved crankpin sleeve a split tube which is adapted to be secured nonrotatably on the crankshaft and to be journaled in the associated connecting-rod as part of the crankpin.

Figure 1:
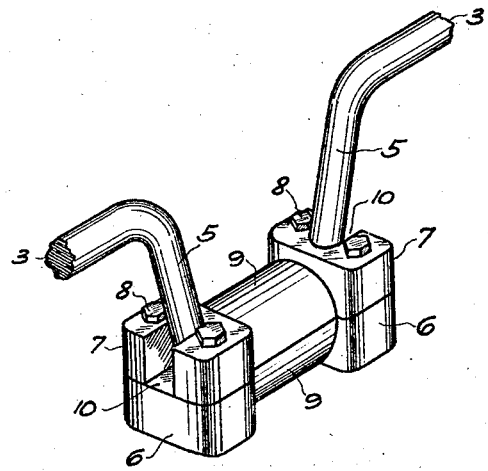
Figure 2:
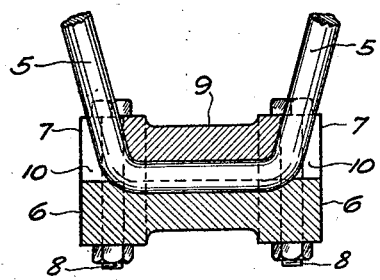

In said drawings, illustrating the best manner in which I have contemplated applying the principles of the invention, Fig. 1 is a perspective view of a crankpin sleeve which is constructed in accordance with these principles and applied to a crankshaft. Fig. 2 is an axial section of the same.

In these views the numeral 3 denotes a crankshaft of common form, having, as integral parts thereof, the crankpin 4 and the crank arms 5. The split tube, constituting the principal part of my improved sleeve, has externally the general form of an oblong rectangular block whose middle portion has been reduced to a cylindrical form. It is split from end to end into two mutually registering semitubular, or channeled, sections 6 and 7, meeting in an axial plane and normally fastened together with the bolts 8. These sections are internally fitted to the crankpin to which they are applied as shown, and are externally adapted as a journal 9 to turn in the terminal bearings, or bearing box, of a connecting-rod not shown in the drawings. To prevent the sleeve from turning on the crankpin, with which it is preferably or approximately coaxial, the inner sleeve section 7 is provided with the terminal slots 10, accommodating the crank arms 5 respectively.

I claim as my invention—

1. A crankpin sleeve comprising a split tube, and means for holding the sections of the tube together and to the crankpin, said tube being adapted to turn in a bearing and to engage the arms of the associated crankshaft nonrotatably.

2. A crankpin sleeve comprising a split tube normally fastened together, terminally slotted to accommodate the crank, and rotatable in a connecting-rod bearing.

3. A crankpin sleeve comprising a split tube having its sections normally bolted together and rotatable in a bearing and having terminal slots adapted to receive the arms of the crank respectively.

CHARLES C. BETTENHAUSEN.